United States Patent
St. Hilaire et al.

(10) Patent No.: US 8,238,611 B2
(45) Date of Patent: *Aug. 7, 2012

(54) ENHANCING STEREO DEPTH MEASUREMENTS WITH PROJECTED TEXTURE

(75) Inventors: Pierre St. Hilaire, Belmont, CA (US); Gaile Gibson Gordon, Palo Alto, CA (US); John Iselin Woodfill, Palo Alto, CA (US); Ronald John Buck, Fremont, CA (US); Steve Clohset, San Francisco, CA (US)

(73) Assignee: Tyzx, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,247

(22) Filed: May 20, 2011

(65) Prior Publication Data

US 2011/0222736 A1 Sep. 15, 2011

Related U.S. Application Data

(63) Continuation of application No. 11/728,202, filed on Mar. 22, 2007, now Pat. No. 7,970,177.

(60) Provisional application No. 60/785,797, filed on Mar. 23, 2006.

(51) Int. Cl.
*G06K 9/00* (2006.01)

(52) U.S. Cl. ........................................ 382/106; 382/154

(58) Field of Classification Search .................. 382/106, 382/154

See application file for complete search history.

(56) References Cited

U.S. PATENT DOCUMENTS

| | | | |
|---|---|---|---|
| 6,674,893 B1 * | 1/2004 | Abe et al. | 382/154 |
| 7,970,177 B2 * | 6/2011 | St. Hilaire et al. | 382/106 |

* cited by examiner

*Primary Examiner* — John Strege

(74) *Attorney, Agent, or Firm* — Van Pelt, Yi & James LLP

(57) ABSTRACT

A system for distance calculation is disclosed. The system includes an illuminator unit, one or more camera units, and a distance processor. The illuminator unit illuminates a scene in a target area using a textured pattern creator and wherein the textured pattern creator includes a diffractive optical element. The one or more camera units captures two or more images of the target area from two or more physical locations. A textured pattern illumination is visible in each of the two or more images of the target area. The images are used to calculate distances to one or more points in the scene in the target area.

32 Claims, 7 Drawing Sheets

FIG. 7A  FIG. 7B

ENHANCING STEREO DEPTH MEASUREMENTS WITH PROJECTED TEXTURE

CROSS REFERENCE TO OTHER APPLICATIONS

This application is a continuation of co-pending U.S. patent application Ser. No. 11/728,202, entitled ENHANCING STEREO DEPTH MEASUREMENTS WITH PROJECTED TEXTURE filed Mar. 22, 2007 which is incorporated herein by reference for all purposes, which claims priority to U.S. Provisional Application No. 60/785,797, entitled ENHANCING STEREO DEPTH MEASUREMENTS WITH PROJECTED TEXTURE filed Mar. 23, 2006 which is incorporated herein by reference for all purposes.

BACKGROUND OF THE INVENTION

Distance to a point in a scene can be estimated from its location in two or more images captured simultaneously. The three dimensional (3D) position of the point can be computed from basic geometric relationships when the 3D relationship between the imagers is known. The challenge in computing distance from multiple images, often referred to as stereo correlation or stereo depth computation, is to automatically and accurately detect the mapping of a point in one image to its mapping in another image. This is most often done by correlating image features from one image to the other. This can be done in selected locations in the image (feature based stereo matching) or at each pixel (dense stereo matching). The underlying assumption in all stereo matching methods, however, is that there must be some identifiable local contrast or feature in the image in order to match that point to its location in another image. Therefore a problem arises when there is no local contrast or feature in the image because stereo matching does not produce valid results in portions of an image that correspond to surfaces with little texture. It would be beneficial if distance could be measured to all points in the image even those areas with no local contrast or features.

BRIEF DESCRIPTION OF THE DRAWINGS

Various embodiments of the invention are disclosed in the following detailed description and the accompanying drawings.

FIGS. 7A-C are block diagrams illustrating examples of captured images in one embodiment.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Calculating distance is disclosed. Texture is projected onto a target area to create local contrast or features that can be used to calculate distances from images. Distances can thereby be calculated for both projected texture features and image features producing more distance information than either source separately. Texture patterns are projected using an illuminator unit which includes a light source (e.g., a diode laser) and a diffractive optical element (DOE). Multiple light sources can be used to generate more features or more illumination in the images. Light sources can be in the visible, infrared, or any other portion of light spectrum. Light sources can be continuous or pulsed. DOE generated textured pattern illumination can be designed with a field of view that matches the imaging cameras of the distance calculating system and with a great range over which the textured patterns are in focus.

Figure 1:
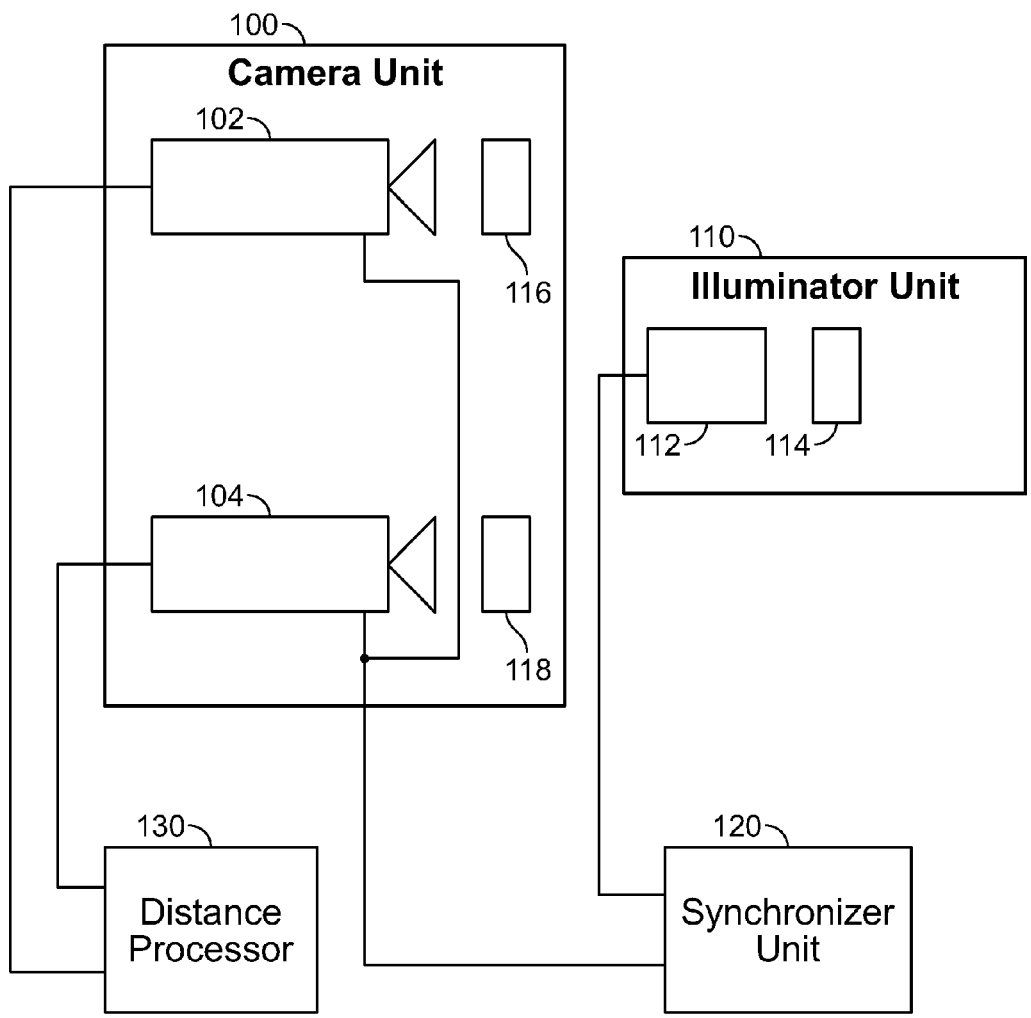
FIG. 1 is a block diagram illustrating an embodiment of a system for calculating distance.

FIG. 1 is a block diagram illustrating an embodiment of a system for calculating distance. In the example shown, camera unit 100 includes cameras 102 and 104 and filters 116 and 118. The distance calculating system requires at least two cameras that provide sufficient information to calculate distance, but can include more. And these at least two cameras can be in one or two camera units. In the event that there are more than two cameras, then there can be any number of camera units and each camera unit can include any number of cameras. Cameras 102 and 104 are positioned to capture an image of a scene in a target area that is illuminated using illuminator unit 110. Illuminator unit 110 includes illumination source 112, and textured pattern creator 114. Illumination source comprises one of the following: a laser, a diode laser, an infrared laser, a laser capable of being pulsed, a light emitting diode, or any other appropriate source for illuminating the scene in a target area with a textured pattern illumination. A non-visible illumination source will enable the distance system to operate without being detectable by a human being who is in the target area. Textured pattern creator 114 includes a diffractive optical element. In some embodiments, illuminator unit 110 can illuminate with or without a textured pattern by including or removing textured pattern creator 114 from the illumination path. In various embodiments, textured pattern creator 114 can be designed with a definable field of view, can create a pattern of illumination that is in focus at substantially all distances, can create a pattern of illumination that can be constantly illuminated or pulsed.

Filters 116 and 118 comprise filters enabling both a textured pattern illuminated image and a non-texture pattern image to be captured. In some embodiments, filters 116 and 118 are not included. In various embodiments, filters 116 and 118 comprise bandpass filters, band blocking filters or notch filters, high pass, low pass, neutral density, or any other appropriate filters. In some embodiments, filters 116 and 118 can be inserted or removed from the optic path of cameras 102 and 104. In some embodiments, images are taken with and without filters 116 and 118 between cameras 102 and 104 and the target area.

In some embodiments, illuminator unit 110 is incorporated into the camera unit 100, producing a single self-contained imaging and projection platform that can be used either with projected texture, or without. In some embodiments, illuminator unit 110 is separate from camera unit 100.

In some embodiments, textured pattern creator 114 generates a textured light pattern by illuminating a diffractive optical element (DOE) with a laser source. A DOE is an optical element in which the desired projection pattern has been encoded as an amplitude or phase profile onto a substrate (typically glass or plastic), in a manner analogous to a hologram. Illuminating the DOE with a laser then reconstructs the desired pattern by the physical process of light diffraction. For example, it is possible to split an incoming beam into an arbitrary number of beamlets whose intensity and directions can be precisely predetermined. Any arbitrary shape, such as grids, letters, or random spot arrays, can be generated by using this method. Moreover, it is possible to project such a pattern at an arbitrary distance if the DOE has been calculated and encoded as the pattern's Fourier transform. This extended depth of field offers a significant advantage to the diffractive solution over the use of a conventional slide film or video image projector. Another advantage is that the optics can be made very compact by using a small, inexpensive diode laser source. Fabricating the original "master" DOE involves complex photolithographic processes similar to semiconductor fabrication, since the surface features of the element are typically of the order of a micrometer. It is thus quite expensive. However, once this master element is fabricated, the DOE can be replicated at a very low unit cost on a plastic substrate by embossing or injection molding. The patterned light emitted by textured pattern creator 114 illuminates the scene of interest, and the image is captured by a pair of cameras whose lenses are separated by a baseline distance. Both the edge features of the scene and the texture pattern can then be used by the processing algorithm to extract a level of performance superior to the separate use of either one.

Camera unit 100 and illuminator unit 110 are synchronized by synchronizer unit 120. Synchronizer unit 120 synchronizes illuminator unit 110 illumination of the target area with the capture of images by camera unit 100 so that the images are appropriately illuminated. In some embodiments, images are captured with textured pattern illumination and without. Synchronizer unit 120 can enable pulsed illumination from one or more illuminator units of a target area so that the target area is appropriately illuminated for being imaged by one or more camera units.

In some embodiments, both the scene illumination and the structured pattern use light within the visible spectrum. In some embodiments, the projected pattern uses light emitted by a near-infrared laser diode. This approach has the property of being undetectable without special equipment. This approach is well adapted to the use of conventional silicon video cameras, whose detectors are very sensitive in the near infrared. Also, high power levels are cost-effectively available from infrared diodes. In some embodiments, a narrow-band notch filter (filters 116 and 118) is placed in front of the camera detectors. This narrowband filter is designed to let pass the wavelength of light corresponding to the laser, while rejecting all other parts of the spectrum. Use of this technique allows a very high degree of texture discrimination by augmenting the signal to noise ratio of the detected pattern. In some embodiment, the notch filter will also let pass a prescribed amount of light outside of the laser spectrum. By using this notch filter, it is possible to tune the depth extraction performance to a specific environment, by separately manipulating the amount of light impinging on the detectors from both the texture projection and ambient illumination.

Distance processor 130 receives two or more images from cameras (e.g., cameras 102 and 104) in camera units such as camera unit 100. Distance processor 130 processes images to calculate distances to objects or points in a scene in a target area using image information and geometric information based on the positions of the cameras that capture the images. A distance to a feature is calculated using the textured pattern by measuring the position of the feature in one image and the position of the feature in another image. In some embodiments, the distance calculation performed by distance processor 130 is a stereo distance calculation where the images are correlated with each other and disparities of features are calculated to calculate distances to objects or points located in the images. A textured pattern illumination increases the features in the images captured and enables a greater number of features to which distances can be calculated. Note also that superimposed textured illumination patterns from multiple sources create patterns that are useful for distance calculation without any change to the calculation.

Figure 2A:
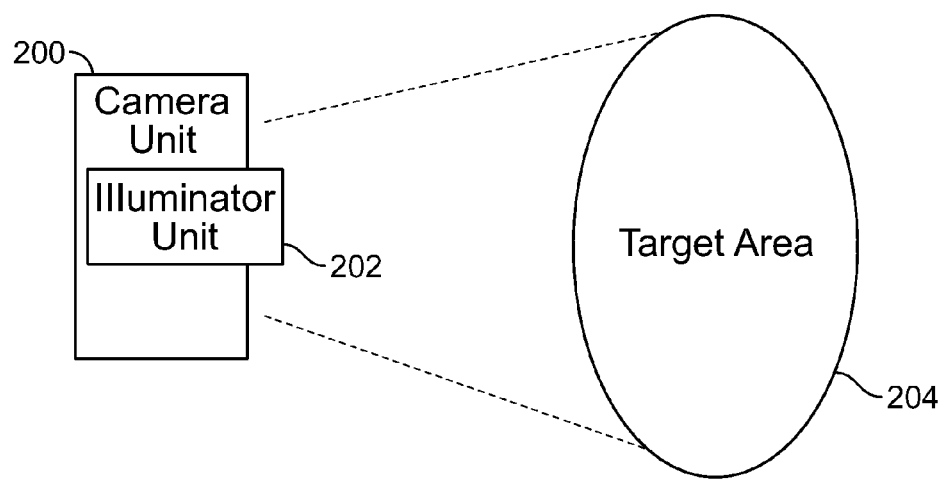
FIG. 2A is a block diagram illustrating an embodiment of a system for calculating distances.

FIG. 2A is a block diagram illustrating an embodiment of a system for calculating distances. In the example shown, camera unit 200 and illuminator unit 202 both are located close to one another. The field of view for camera unit 200 is similar to the area that is illuminated by illuminator unit 202. Camera unit 200 is able to image objects or points in a scene in target area 204 and illuminator unit 202 is able to illuminate objects or points in the scene in target area 204. The axis along which camera unit 200 images is similar to the axis along which illuminator unit 202 illuminates.

Figure 2B:
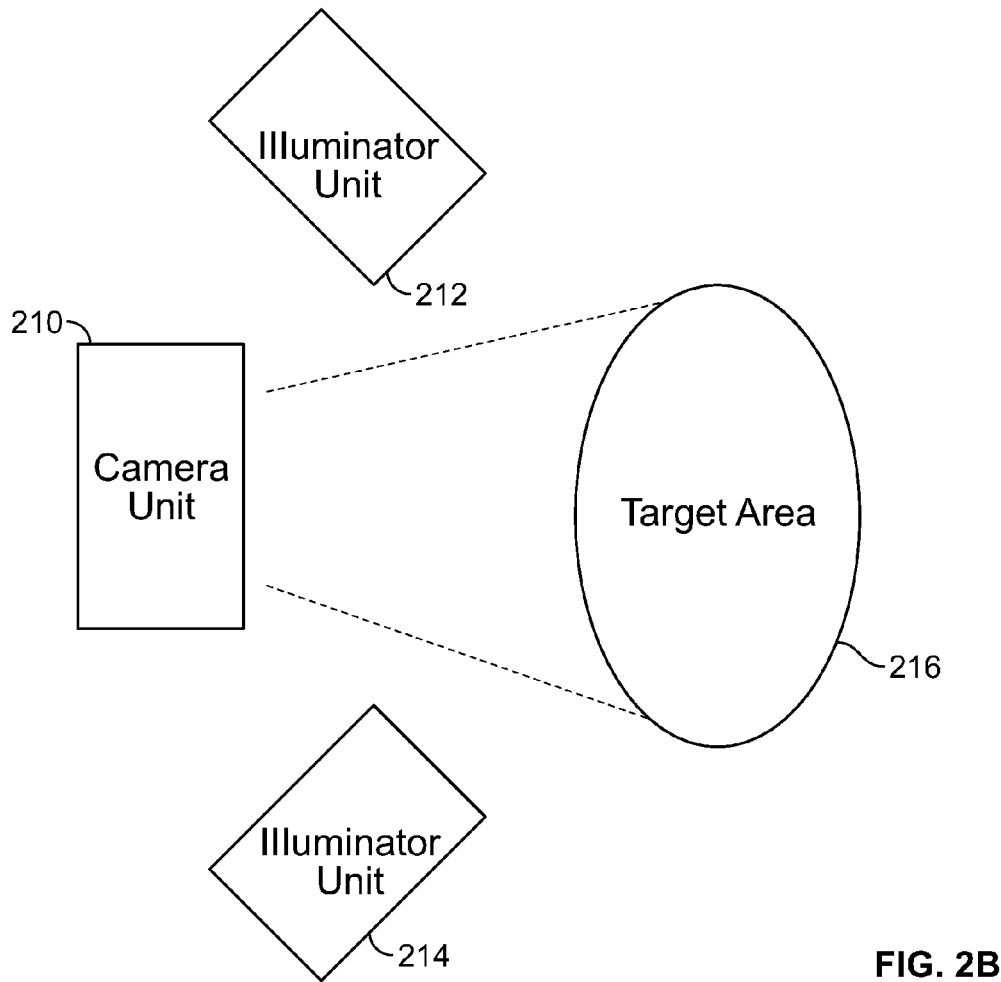
FIG. 2B is a block diagram illustrating an embodiment of a system for calculating distances.

FIG. 2B is a block diagram illustrating an embodiment of a system for calculating distances. In the example shown, camera unit 210 and illuminator units 212 and 214 are located apart from each other. The field of view for camera unit 210 is similar to the area that is illuminated by illuminator units 212 and 214. Camera unit 210 is able to image objects or points in a scene in target area 216 and illuminator units 212 and 214 are able to illuminate objects or points in a scene in target area 216. The axis along which camera unit 210 captures images is neither similar to the axis along which illuminator unit 212 illuminates nor similar to the axis along which illuminator unit 214 illuminates. Either illuminator unit 212 or 214 or both illuminator units 214 and 214 can illuminate objects or points in a scene in target area 216 while camera unit 210 captures images of objects or points in a scene in target area 216.

Figure 3A:
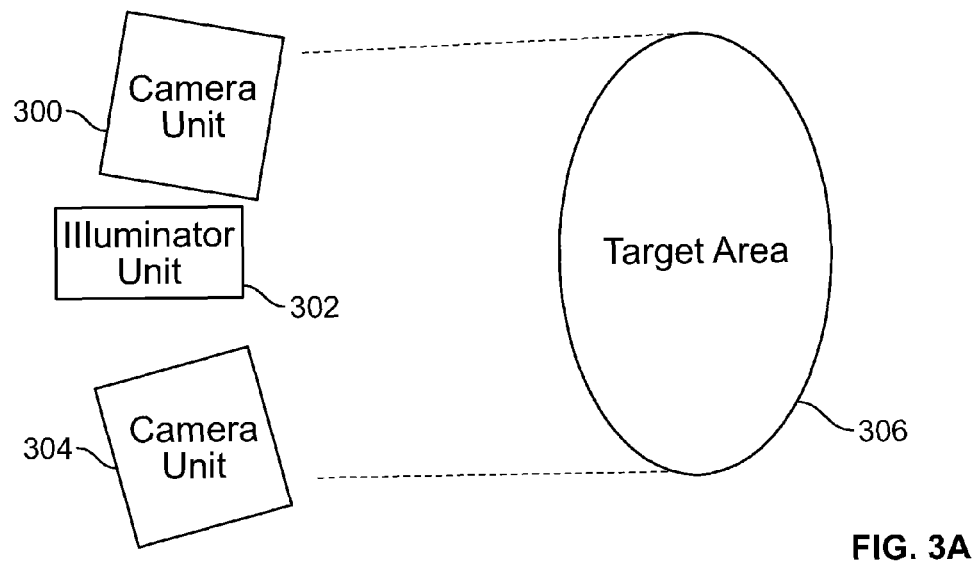
FIG. 3A is a block diagram illustrating an embodiment of a system for calculating distances.

FIG. 3A is a block diagram illustrating an embodiment of a system for calculating distances. In the example shown, camera units 300 and 304 and illuminator units 302 are located close to each other. The field of view for camera units 300 and 304 is similar to the area that is illuminated by illuminator unit 302. Camera units 300 and 304 are able to image objects or points in a scene in target area 306 and illuminator unit 302 is able to illuminate objects in target area 306. The axes along which camera units 300 and 304 capture images are somewhat similar to the axis along which illuminator unit 302 illuminates. Either camera unit 300 or 304 or both camera units 300 and 304 can capture images of objects or points in a scene in target area 306 while illuminator unit 302 illuminates objects or points in a scene in target area 306.

Figure 3B:
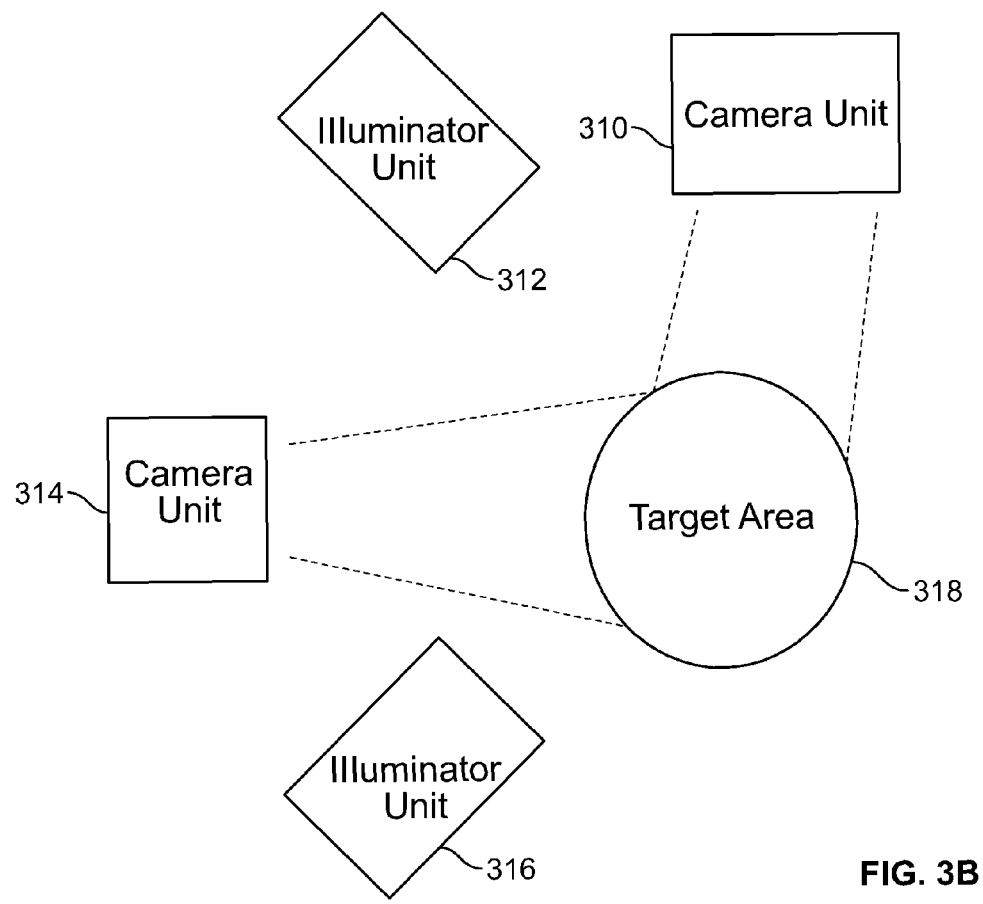
FIG. 3B is a block diagram illustrating an embodiment of a system for calculating distances.

FIG. 3B is a block diagram illustrating an embodiment of a system for calculating distances. In the example shown, camera units 310 and 314 and illuminator units 312 and 316 are located apart from each other. The fields of view for camera units 310 and 314 are similar to the areas that are illuminated by illuminator units 312 and 316. Camera units 310 and 314 are able to image objects or points scene in target area 318 and illuminator units 312 and 316 are able to illuminate objects or points in a scene in target area 318. The axis along which camera unit 310 captures images is neither similar to the axis along which illuminator unit 312 illuminates nor similar to the axis along which illuminator unit 316 illuminates. Similarly, the axis along which camera unit 314 captures images is neither similar to the axis along which illuminator unit 312 illuminates nor similar to the axis along which illuminator unit 316 illuminates. Either illuminator unit 312 or 316 or both illuminator units 312 and 316 can illuminate objects or points in a scene in target area 318 while either camera unit 310 or 314 or both camera units 310 and 314 capture images of objects or points in a scene in target area 318. Some combinations of camera unit and illuminator may not be as optimal as other combinations depending upon the texture pattern illumination visible to the two or more cameras of the camera unit(s) that are capturing images of objects or points in a scene in target area 318.

In various embodiments, the illumination from an illumination unit can cover a similar area, a smaller area, or a larger area as compared to the area that is imaged by a camera unit. In some embodiments, an illumination unit can move so that the illumination from it can cover more of the scene in the target area. In some embodiments, multiple images or a long exposure image can be used in conjunction with a moving illumination source to be used as inputs for distance calculations.

Figure 4:
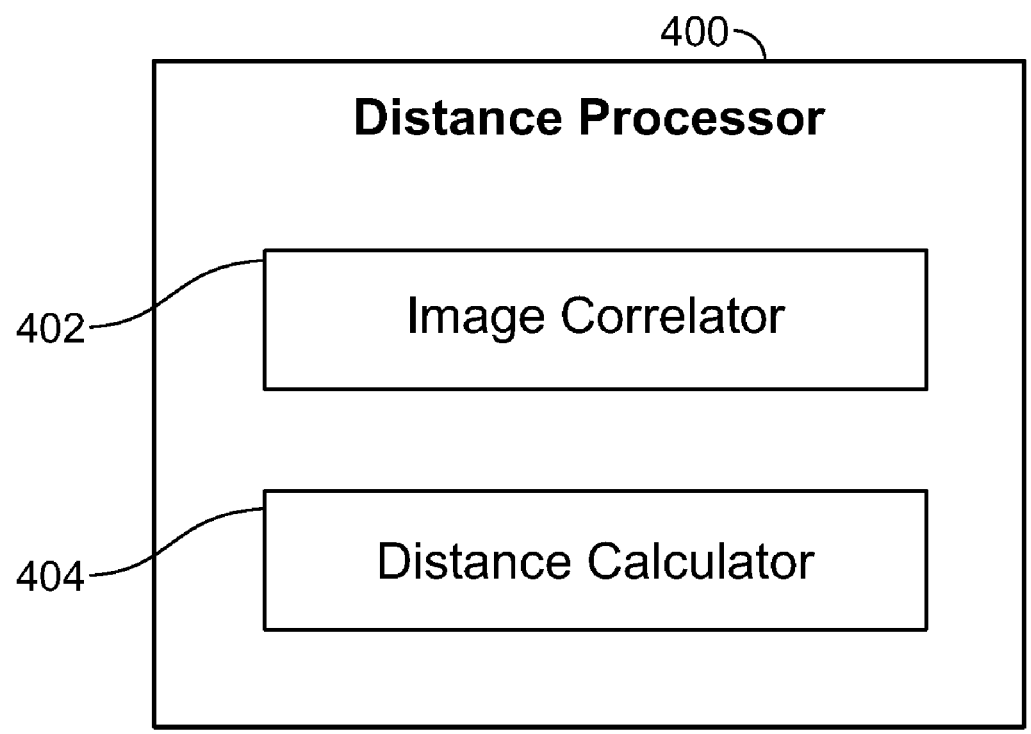
FIG. 4 is a block diagram illustrating an embodiment of a distance processor.

FIG. 4 is a block diagram illustrating an embodiment of a distance processor. In some embodiments, the distance processor 400 of FIG. 4 is used to implement 130 of FIG. 1. In the example shown, distance processor 400 includes image correlator 402 and distance calculator 404. Image correlator 402 receives two or more images and correlates the images to locate features in a first image that correspond to features in a second image. The corresponding features are then located within the image to see if there is a relative shift. The shift information and geometry information of where the cameras are located can be used to calculate distance to the feature. Other information that can be used in the calculation of distance and processing of the images includes modulation transfer function, distortion parameters of the lens of a camera, properties of the imaging array (e.g., the charge coupled device), illuminator unit position, the focal length and depth of field of the imaging lens, the principle point on the imager, or any other relevant information. In various embodiments, the distance processor comprises a pipelined hardware processor, a software processor, or a partially hardware and partially software processor.

Figure 5:
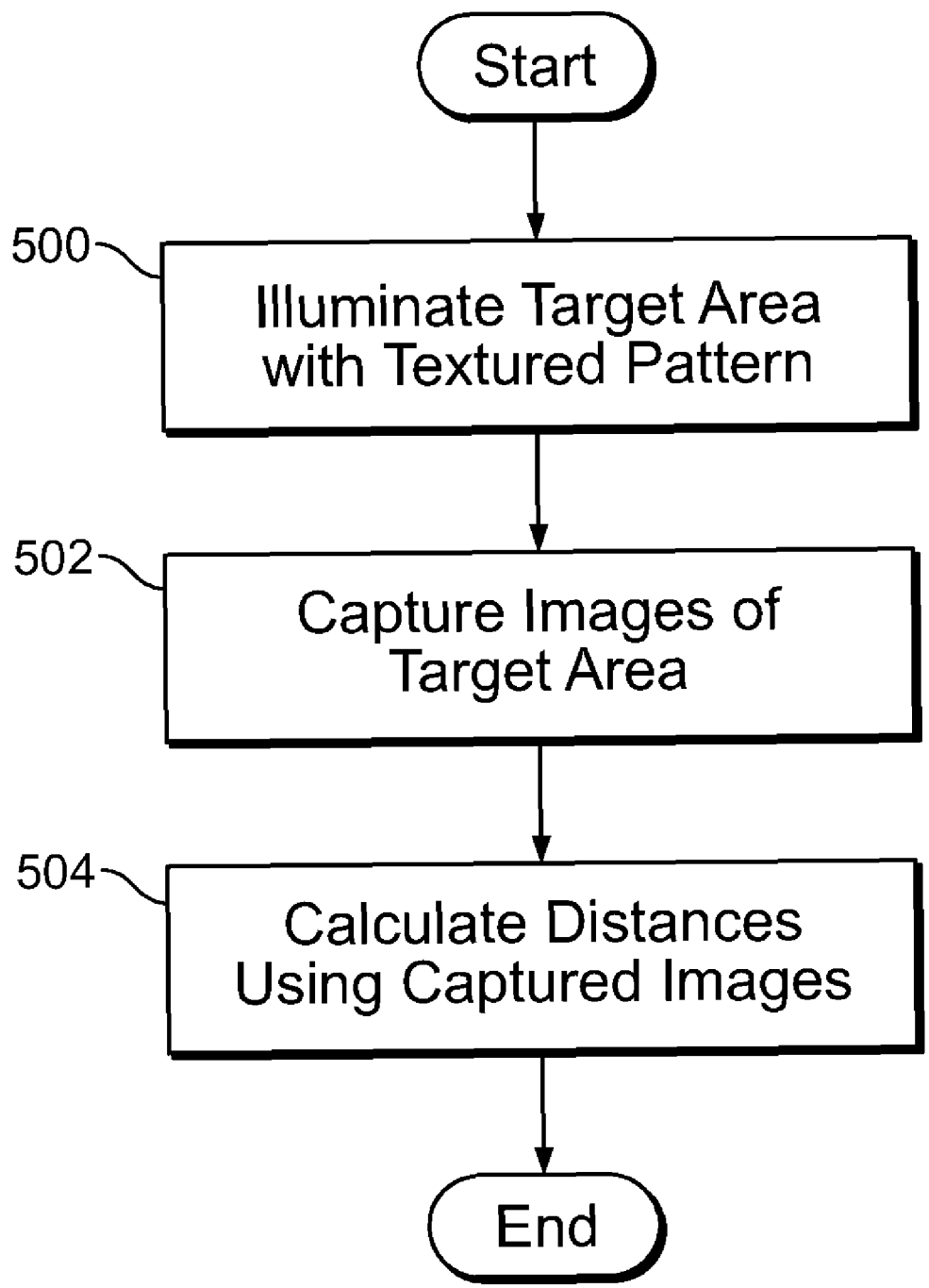
FIG. 5 is a flow diagram illustrating an embodiment of a process for calculating distance.

FIG. 5 is a flow diagram illustrating an embodiment of a process for calculating distance. In the example shown, in 500 target area is illuminated using textured pattern. In 502, images are captured of the target area. In 504, distances are calculated using captured images.

Figure 6A:
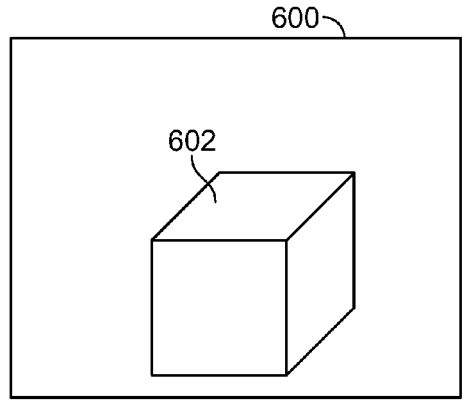
FIGS. 6A-C are block diagrams illustrating examples of captured images in one embodiment.
Figure 6B:
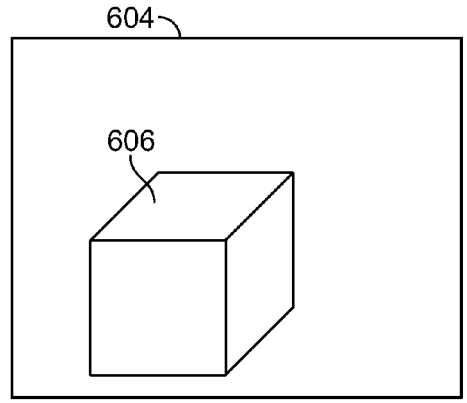
Figure 6C:
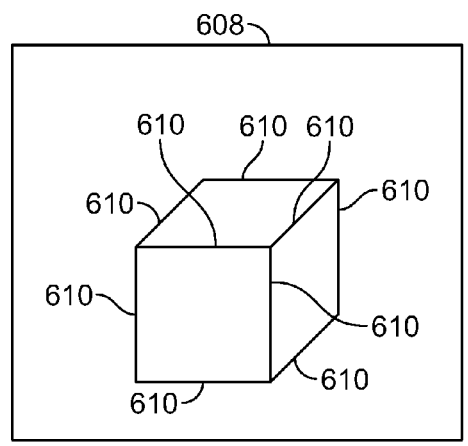

FIGS. 6A-C are block diagrams illustrating examples of captured images in one embodiment. In the example shown, left image 600 includes object 602. Left image 600 is captured by a camera positioned on a left side. Right image 604 includes the corresponding object 606. Right image 604 is captured by a camera positioned on a right side. Note the relative position shift of 602 and 606 with respect to the other object as compared to the left image. Distance output image 608 is calculated by locating corresponding features between the left image 600 and right image 604. In some embodiments, corresponding features are located using correlation of subsections of the image. Note that on the faces there is little or no information from which to find correspondence and because of that little or no depth information can be derived. Edges 610 may provide good depth information since there is some contrast present at which correspondence between the left and right images may be established.

Figure 7C:
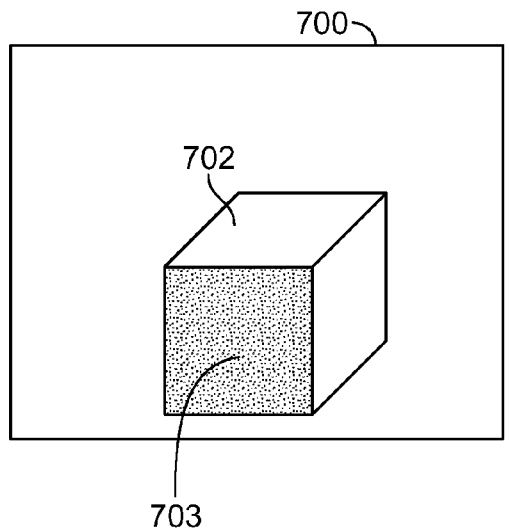
Figure 7C:
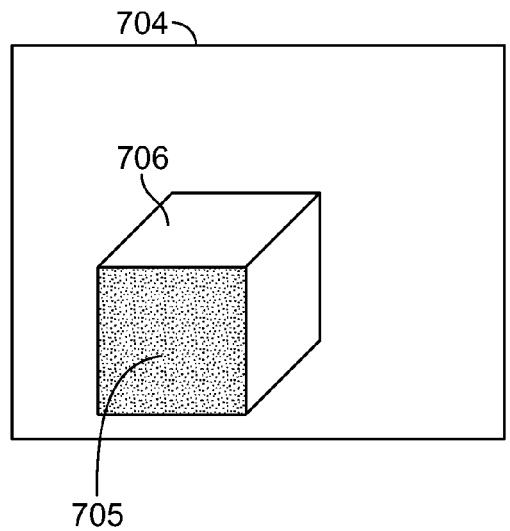
Figure 7C:
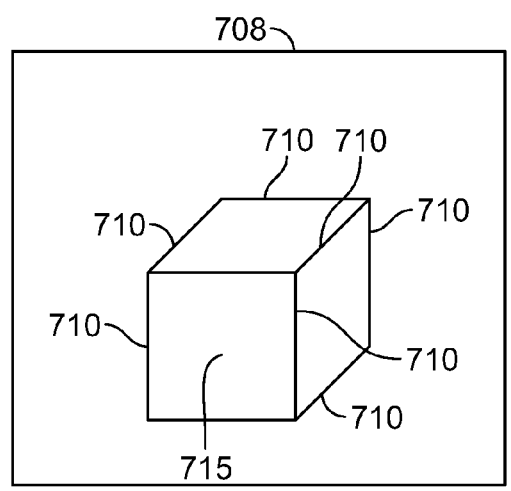

FIGS. 7A-C are block diagrams illustrating examples of captured images in one embodiment. In the example shown, left image 700 includes object 702. Left image 700 is captured by a camera positioned on a left side and illuminated using a textured pattern. Textured pattern illumination appears as textured pattern features 703 on one face of object 702. Right image 704 includes the corresponding object 706. Right image 704 is captured by a camera positioned on a right side and illuminated using a textured pattern. Textured pattern illumination appears as textured pattern features 705 on one face of object 706. Note the relative position shift of 702 and 706 with respect to the other object as compared to the left image. Distance output image 708 is calculated by locating corresponding features between points in the scenes of left image 700 and right image 704. In some embodiments, corresponding features are located using correlation of subsections of the image. Note that on the textured pattern illuminated face there is substantial information in the form of edges or contrast features that can be used to find correspondence. Because of this information, depth information can be derived. Edges 710 may provide good depth information since there is some contrast present at which correspondence between the left and right images can be established. Distance output image 708 includes the distances calculated not just at the edges 710, but also on the whole face illuminated by the texture pattern 715. Much more distance measurement information is available for the distance output image 708 as compared to one not using the textured pattern illumination.

In various embodiments, illuminated textured pattern 703 and 705 is a geometric pattern, is random pattern, is a grayscale pattern, is an irregular pattern, or is any pattern that is useful in finding corresponding features in multiple images in order to calculate a depth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for calculating distance comprising:
an illuminator unit, wherein the illuminator unit illuminates a scene in a target area using a textured pattern creator and wherein the textured pattern creator includes a diffractive optical element;
one or more camera units, wherein the one or more camera units captures two or more images with illumination of the target area from two or more physical locations of the scene and one or more images without illumination of the target area;

a synchronizer, wherein the synchronizer synchronizes the illuminator unit to illuminate the scene for capturing the two or more images with patterned illumination, and wherein the synchronizer synchronizes the illuminator unit to not illuminate the scene for capturing the one or more images without patterned illumination; and a distance processor, wherein the textured pattern illumination visible in the two or more images of the target area and the one or more images without patterned illumination are used to calculate distances to one or more points in the scene in the target area.

2. A system as in claim 1, wherein the illuminator unit includes an illumination source.

3. A system as in claim 2, wherein the illumination source is one of the following: a laser, a diode laser, an infrared laser, a laser capable of being pulsed, a light emitting diode, or a flash lamp.

4. A system as in claim 1, wherein the textured pattern creator can be designed with a definable field of view.

5. A system as in claim 1, wherein the textured pattern creator can create a pattern of illumination that is in focus at substantially all distances.

6. A system as in claim 1, wherein the textured pattern creator can create a pattern of illumination that can be pulsed on.

7. A system as in claim 1, wherein one or more scene features visible in each of the two or more images of the target area is used to calculate distances to one or more points in the scene in the target area.

8. A system as in claim 1, wherein the camera unit includes a bandpass filter.

9. A system as in claim 1, wherein the illuminator unit is located in close proximity to the camera unit.

10. A system as in claim 1, wherein the illuminator unit is not located in close proximity to the camera unit.

11. A system as in claim 1, wherein the illuminator unit is one of a plurality of illuminator units, wherein the textured pattern creator of each of the plurality of illuminator units illuminates the scene, and wherein the scene includes a region illuminated by one or more of the plurality of illuminator units.

12. A system as in claim 1, wherein the illuminator unit moves.

13. A system as in claim 1, wherein the distance processor comprises one of the following: a pipelined hardware processor, a software processor, or a partially hardware and partially software processor.

14. A system as in claim 1, wherein the distance processor uses the two or more images and information about the two or more physical locations from which the two or more images are captured to calculate distances to the one or more points in the scene in the target area.

15. A system as in claim 1, further comprising a synchronizer unit, wherein the synchronizer unit synchronizes the illuminator unit and the camera unit so that the two or more images captured by the camera unit are appropriately illuminated.

16. A method for calculating distances comprising:

illuminating a scene in a target area using a textured pattern creator and wherein the textured pattern creator includes a diffractive optical element;

capturing two or more images with illumination of the target area from two or more physical locations of the scene and one or more images without illumination of the target area;

synchronizing the illuminator unit to illuminate the scene for capturing the two or more images with patterned illumination;

synchronizing the illuminator unit to not illuminate the scene for capturing the one or more images without patterned illumination; and calculating distances to the one or more points in the scene in the target area using the textured pattern illumination visible in each of the two or more images of the target area and the one or more images without patterned illumination.

17. A method as in claim 16, wherein illuminating includes using an illumination source.

18. A method as in claim 17, wherein the illumination source is one of the following: a laser, a diode laser, an infrared laser, a laser capable of being pulsed, a light emitting diode, or a flash lamp.

19. A method as in claim 18, wherein the illuminating includes using a textured pattern creator.

20. A method as in claim 19, wherein the textured pattern creator comprises a diffractive optical element.

21. A method as in claim 19, wherein the textured pattern creator can be designed with a definable field of view.

22. A method as in claim 19, wherein the textured pattern creator can create a pattern of illumination that is in focus at substantially all distances.

23. A method as in claim 19, wherein the textured pattern creator can create a pattern of illumination that can be pulsed on.

24. A method as in claim 19, wherein the textured pattern creator can create a pattern of illumination that can be pulsed on with sufficient intensity to enable the camera unit to capture an image of the textured pattern.

25. A method as in claim 16, wherein illuminating includes using a filter.

26. A method as in claim 16, wherein illuminating includes using a filter enabling both a textured pattern illuminating image and a non-texture pattern illuminating image to be captured.

27. A method as in claim 17, wherein the illumination source is in close proximity to the camera unit.

28. A method as in claim 17, wherein the illumination source is not in close proximity to the camera unit.

29. A method as in claim 17, wherein the illumination source is one of a plurality of illumination sources located in a plurality of locations, wherein the textured pattern creator of each of the plurality of illuminator units illuminates the scene, and wherein the scene includes a region illuminated by one or more of the plurality of illuminator units.

30. A method as in claim 16, wherein calculating distance uses one of the following: a pipelined hardware processor, a software processor, or a partially hardware and partially software processor.

31. A method as in claim 16, wherein calculating distance uses the two or more images and position information from which the two or more images are captured to calculate distances to the one or more points in the scene in the target area.

32. A method as in claim 16, further comprising synchronizing illuminating the one more points in the scene in the target area and the capturing of two or more images so that the two or more images captured are appropriately illuminated.

* * * * *